United States Patent
Reeves et al.

(10) Patent No.: US 8,868,650 B1
(45) Date of Patent: Oct. 21, 2014

(54) CONSOLIDATING MULTI-PARTY COMMUNICATIONS

(75) Inventors: Raymond Emilio Reeves, Olathe, KS (US); Ryan Alan Wick, Apollo Beach, FL (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 702 days.

(21) Appl. No.: 12/834,613

(22) Filed: Jul. 12, 2010

(51) Int. Cl.
G06F 15/16 (2006.01)
(52) U.S. Cl.
USPC ........ 709/204; 709/206; 370/260; 348/14.01; 455/216; 455/463
(58) Field of Classification Search
USPC ............... 709/204, 206; 370/260; 348/14.01; 455/216, 463
See application file for complete search history.

(56) References Cited

U.S. PATENT DOCUMENTS

| | | | |
|---|---|---|---|
| 7,031,700 B1* | 4/2006 | Weaver et al. | 455/420 |
| 2004/0213212 A1* | 10/2004 | Reding et al. | 370/352 |
| 2007/0015519 A1* | 1/2007 | Casey | 455/456.2 |
| 2008/0004038 A1* | 1/2008 | Dunko | 455/456.1 |
| 2009/0327415 A1* | 12/2009 | Alberth et al. | 709/204 |
| 2010/0302345 A1* | 12/2010 | Baldino et al. | 348/14.08 |

\* cited by examiner

*Primary Examiner* — Hitesh Patel

(57) ABSTRACT

Methods, devices, and products facilitate consolidating multi-user communications by redirecting calls to a multi-user device, with which multiple users can interact. A multi-user device monitors the density of users and devices within a specified distance of the multi-user device. Based at least in part on the proximity of a user, the multi-user device can designate a preferred device associated with the user and inform a multi-user-device server of the preference. The multi-user-device server provides a conference server with instructions that include contact information for the preferred devices to be used by the conference server when initiating a multi-user communication session.

10 Claims, 7 Drawing Sheets

CONSOLIDATING MULTI-PARTY COMMUNICATIONS

SUMMARY

Embodiments of the technology are defined by the claims below, not this summary. A high-level overview of various aspects of the technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to consolidate conference communications and other multi-party communications using dynamic awareness of available multi-user devices. Utilization of aspects of the invention described herein allows for routing conference communications to a multi-user device when two or more of the conference participants are able to utilize the multi-user device together during the conference.

In a first aspect, embodiments of the invention include computer-readable media with computer-executable instructions that facilitate an illustrative method of consolidating a multi-party conference. In embodiments, the illustrative method includes receiving a conference-setup request from a computing device associated with a first user. In an embodiments, for example, the conference-setup request can include a request to setup a conference between the first user, a second user and a third user. Embodiments of the illustrative method further include determining that a multi-user device is designated as a preferred device associated with the third user and establishing the conference, in which the third user participates by way of the multi-user device.

In a second aspect, embodiments of the invention include computer-readable media with computer-executable instructions that facilitate an illustrative method of consolidating a multi-party conference. According to various embodiments, the illustrative method includes receiving conference-contact information from a multi-user device. For example, the conference-contact information can include an indication of whether a first user is within a predetermined physical proximity of the multi-user device. In embodiments, the illustrative method further includes storing the conference-contact information in a status record maintained by a multi-user-device server, which may maintain any number of status records corresponding to multi-user devices. Upon receiving a conference notification from a conference server, the multi-user-device server determines, based at least in part upon said conference-contact information, a preferred device associated with the first user. In embodiments, the illustrative method can also include providing the conference server with a setup instruction that includes conference-contact information that identifies the preferred device associated with the first user.

In a third aspect, a multi-user communications device facilitates consolidation of multi-party communications. According to embodiments, the device includes a user-proximity detection component that determines whether a first user is within a specified distance of the multi-user device and that generates user-proximity information associated with the first user. In embodiments, the device also includes a preference manager that receives user-proximity information from the user-proximity detection component and determines a preferred device associated with the first user. According to some embodiments, the device further includes a reporter that provides a multi-user-device server with conference-contact information associated with the first user.

BRIEF DESCRIPTION OF THE SEVERAL VIEWS OF THE DRAWINGS

Illustrative embodiments of the technology are described in detail below with reference to the attached drawing figures, wherein.

DETAILED DESCRIPTION

Figure 1:
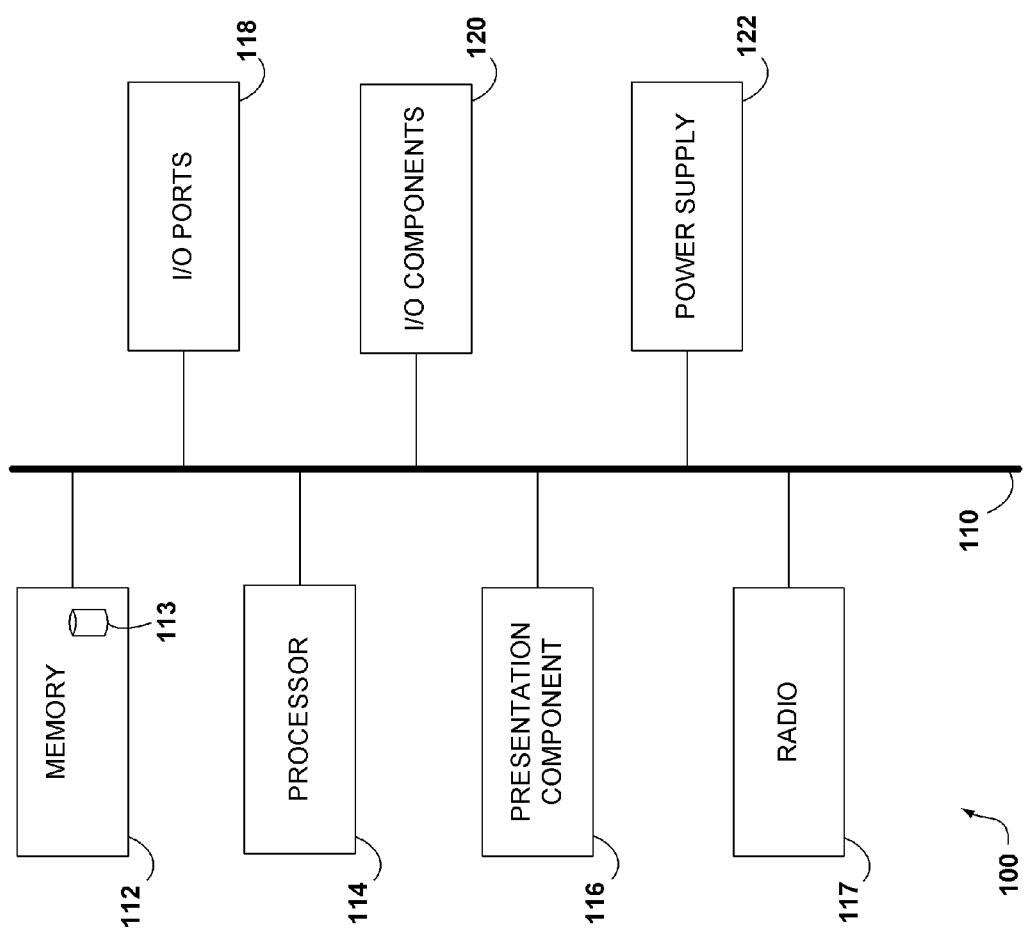
FIG. 1 depicts an illustrative computing device suitable for use in connection with embodiments of the invention.

The subject matter of the present technology is described with specificity herein to meet statutory requirements. However, the description itself is not intended to define the technology, which is what the claims do. Rather, the claimed subject matter might be embodied in other ways to include different components, steps, or combinations of components or steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| API | Application Programming Interface |
| CDMA | Code Division Multiple Access |
| CD-ROM | Compact Disc Read-Only Memory |
| DVD | Digital Versatile Disc |
| EEPROM | Electrically Erasable Programmable Read-Only Memory |
| GPRS | General Packet Radio Service |
| GSM | Global System for Mobile Communications |
| I/O | Input/Output |
| LAN | Local Area Network |
| LED | Light-Emitting Diode |
| LTE | Long Term Evolution |
| MN | Mobile Network |
| MTU | Mobile Telecommunications Unit |
| PDA | Personal Digital Assistant |
| PTL | Push-to-Locate |

| | |
|---|---|
| PTSN | Public Switched Telephone Network |
| PTT | Push-to-Talk |
| PTV | Push-to-View |
| RAM | Random Access Memory |
| ROM | Read-Only Memory |
| TDMA | Time Division Multiple Access |
| USB | Universal Serial Bus |
| WAN | Wide Area Network |
| WiMax | Worldwide Interoperability for Microwave Access |
| WLAN | Wireless Local Area Network |

Embodiments of the technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-executable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

To provide context for the detailed description of the inventions below, a brief overview of some embodiments of aspects of the inventions follows. Increasingly, telecommunication service consumers are looking for ways to utilize services in efficient, economical, and safe ways. For example, companies are often interested in reducing costs and families may be interested in enjoying conferencing events together. Using the latter as an example, several family members could be traveling in their vehicle, which is equipped with a multi-user device that includes, for instance, an on-board flat screen, computer and broadband mobile telecommunications unit (MTU). If a call is placed to one or more of those individuals in the family, embodiments of the invention can facilitate determining, based on the location and preferences of the callers, whether the call is directly routed to the vehicle's MTU or separately to each individual's mobile device. In this manner, a multi-party call can be consolidated by directing several of the calls to one device.

Embodiments of the invention include enhancements to the conference-establishment process, devices, and network architectures to facilitate consolidation of multi-party communications. For example, in an embodiment, a multi-user device can broadcast its presence to, and detect the presence of, all communication devices within physical boundaries established for the multi-user-device range (e.g., a range in which a user or device must be for the redirection of a call to the multi-device to be triggered). The multi-user device can keep a multi-user-device server always aware of which mobile devices and/or users are within the multi-user-device range. In embodiments, the multi-user device can designate itself as a preferred device associated with a user for receiving conference invitations. According to embodiments of the invention, users can be provided with interfaces and the like that allow the users to override designations of preferred devices, input their own designations, configure rules for designating preferred devices, and the like.

According to various embodiments of the invention, upon receiving a conference-setup request, a conference server verifies, by interacting with the multi-user-device server, the preferred device for each user and forwards conference invitations to the users via the users' preferred devices. In some embodiments, redirection of conference invitations can be triggered based on the density of users and/or devices within the multi-user-device range. For instance, in an embodiment, when the number of devices within the multi-user-device range exceeds a threshold, the conference server can be instructed to attempt to establish communication with the multi-user device, instead of each individual user's device.

According to some embodiments, prior to initiation of a conference, the multi-user device can present an alert with a list of users and terminals originally targeted. The users in the proximity of the multi-user device, which are listed with the alert, can provide input to the multi-user device to indicate whether they will communicate via the multi-user device (e.g., they can "accept" the conference invitation). Other users can decline, or if a user is no longer near the multi-user device, the user may input nothing at all. The inputs (or lack thereof) are passed to the conference server, which establishes a conference. For those users that either did not respond or rejected the conference invitation via the multi-user device, in embodiments, the conference server can resend conference invitations to those user's individual devices or some other designated device.

Turning now to FIG. 1, a block diagram of an illustrative computing device 100 is provided and referenced generally by the numeral 100. In embodiments, computing device 100 can be a server, a bank of servers, a personal computer, a mainframe, a mobile phone, a personal digital assistant (PDA), a smart phone, a laptop computing device, a mobile computer, and the like. Computing device 100 is capable of transmitting and/or receiving one or more forms of communications. In some embodiments, computing device 100 can communicate by way of cable, a public switched telephone system (PTSN), a wireless protocol, or the like. Examples of communications that can be transmitted and/or received include voice-calls, text messages, multimedia messages, e-mails, calendar updates, task reminders, push-to-x interactions (e.g., push-to-talk (PTT), push-to-video (PTV), push-to-locate (PTL), etc.), and the like.

Although some components are shown in the singular, they may be plural. For example, computing device 100 might include multiple processors or multiple radios, etc. In other embodiments, some components shown may not be present upon implementation. For example, where computing device 100 is a mobile communications device such as, for example, a cell phone, a smart phone, or the like, computing device 100 generally will include a radio 117. On the other hand, where computing device 100 is a server, personal computer, laptop, or the like, computing device 100 may not necessarily include a radio 117.

As illustratively shown, computing device 100 includes a bus 110 that directly or indirectly couples various components together including memory 112, a processor 114, a presentation component 116, a radio 117, input/output ports 118, input/output components 120, and a power supply 122.

Various memory components that memory 112 might take the form of have been previously described. Thus, further elaboration thereon is unnecessary here, only to say that memory component 112 can include any type of medium that is capable of storing information (e.g., a database). A database can be any collection of information. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless (also referred to herein, interchangeably, as "mobile") telecommunications network. Illustrative wireless telecommunications technologies include CDMA, GPRS, TDMA, GSM, and the like (including what is known in the art as WiMax technology and also Long Term Evolution (LTE)). In some embodiments, radio 117 might also facilitate other types of wireless communications including Wi-Fi communications, Bluetooth® communications, and GIS communications.

Input/output ports 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power computing device 100.

Figure 2:
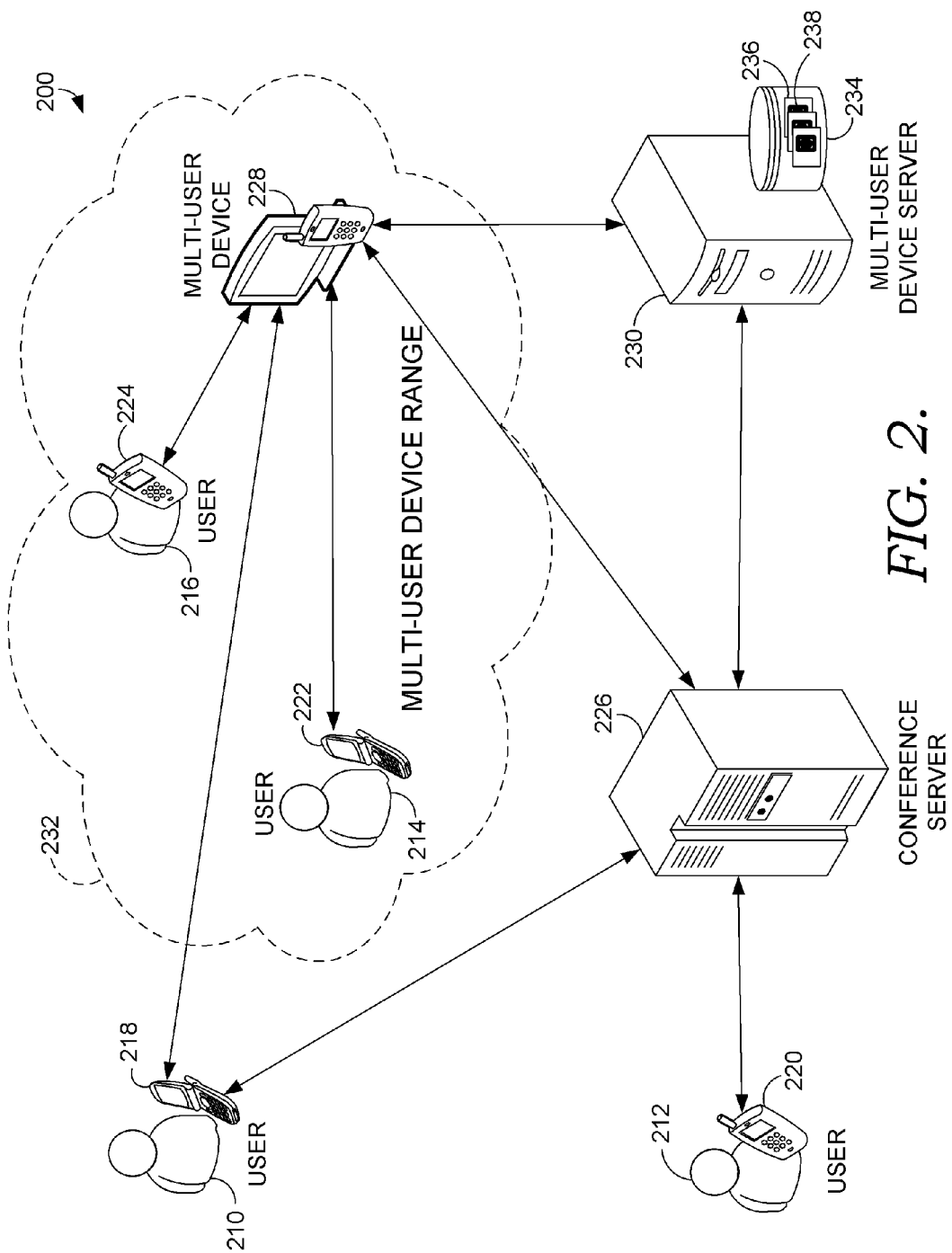
FIG. 2 depicts an illustrative network environment suitable for practicing embodiments of the invention.

Turning now to FIG. 2, an exemplary network environment 200 is illustrated. Exemplary network environment 200 includes users 210, 212, 214, and 216 who communicate by way of devices 218, 220, 222, and 224, respectively. Exemplary network environment 200 also includes conference server 226, multi-user device 228, and multi-user-device server 230. The components 218, 220, 222, 224, 226, and 228 can communicate, for example, over one or more networks (not illustrated herein for clarity). Such networks can be any type of network such as, for example, the Internet, a local-area-network (LAN), a wide-area-network (WAN), a wireless LAN (WLAN), a mobile network (MN), a PTSN, or the like.

The exemplary network environment 200 shown in FIG. 2 is an example of one suitable network environment 200 and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, in various embodiments, components of network environment 200 can be implemented in any number of configurations, using any number of machines, and the like.

In embodiments, other arrangements and elements (e.g., machines, components, interfaces, functions, orders, servers, databases, etc.) can be used in addition to, or instead of, those shown and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions can be carried out by a processor executing instructions stored in memory.

It should be understood by those knowledgeable about the art that each of these elements of the network environment 200 is also scalable. That is, for example, network environment 200 can include a large number of mobile devices, users, servers, multi-user devices, or the like. Additionally, for example, a mobile network (not illustrated in FIG. 2), which may host, for example, conference server 226 and multi-user-device server 230 may actually include a number of network elements, including and in addition to, conference server 226 and multi-user-device server 230. Any or all of these network elements may be implemented using any number of server modules, devices, machines, and the like.

With continued reference to FIG. 2, user devices 218, 220, 222, and 224 can be any type of devices capable of transmitting and receiving communications including, for example, landline telephones, mobile phones, computers, smart devices, and the like. For example, in embodiments, user devices 218, 220, 222, and 224 can include mobile device 100 described above with reference to FIG. 1. As the term is used herein, "multi-user device" can include any type of computing device capable of facilitating communications between one or more users that interact with the multi-user device and other devices or users in communication therein. In some embodiments, any or all of user devices 218, 220, 222, and 224 can also be multi-user devices.

In embodiments, a multi-user device facilitates such communications by providing input and output devices that receive input and provide output to multiple users respectively. For example, a multi-user device can include a large screen or a video projector for making video communications available to multiple users at the same time. In some embodiments, a multi-user device can include speakers that project audio communications to multiple users, microphones that record sound made by multiple users, and the like.

Because of device limitations, users' comfort limitations, practical circumstances, and the like, in embodiments, multi-user device 228 has an associated multi-user-device range 232. Multi-user-device range 232 includes a specified distance in one or more directions from multi-user device 228 within which multi-user device 228 can be used, for example, by users 214 and 216 to communicate with other devices or users such as, for example, users 210 and 212 via user devices 218 and 220, respectively. In embodiments, multi-user device 228 can include a residential system that may include, for example, a desktop computer or a laptop computer. In other embodiments, multi-user device 228 can include a mobile telecommunications unit (MTU) carried on a person or disposed within a vehicle. For example, an MTU can be a device installed in a vehicle which is equipped with an onboard display device, a computing device, and mobile telecommunications technology allowing for wireless communications.

In embodiments, multi-user device 228 interacts with multi-user-device server 230. Multi-user-device server 230 can be any type of server, function, machine, and the like. In embodiments, multi-user device-server 230 is located on a mobile network (not shown herein for clarity). According to various embodiments of the invention, multi-user-device server 230 includes a database 234 in which is stored a status record 236 which corresponds to multi-user device 228.

In various embodiments, exemplary network environment 200 can include any number of multi-user devices 228, and any number of multi-user-device servers 230. In some embodiments, multi-user-device server 230 maintains status records 236 for a number of multi-user devices 228. In this case, other multi-user-device servers 230 may maintain status records 236 for other groups of multi-user devices 228. According to various embodiments, the status record 236 corresponding to multi-user device 228 can be updated dynamically.

As further explained below with references to FIGS. 3-4, status record 236 can include conference-contact information associated with a user 214 or 216. Multi-user device 228 includes technology that allows multi-user device 228 to determine a density state associated with multi-user device 228. The density state can include information related to the number of users 214 and 216 that are within the multi-user-device range 232, number of devices 222 and 224 that are within the multi-user-device range 232, and other information including the distance from multi-user device 228 that a user 214 or 216, or a device 222 or 224, is located.

In embodiments, multi-user device 228 may register, for example, users 210, 214, and 216 which may in turn provide information associated with the respective mobile devices 218, 220, and 224. In embodiments, multi-user device 228 monitors multi-user device range 232 to keep a dynamic density status associated with multi-user device 228. In some embodiments, multi-user device can be adapted to monitor a density of mobile devices 218, 220, and 224 within multi-user-device range 232. In some embodiments, multi-user device 228 can monitor a density of users 210, 214, and 216 within multi-user-device range 232. In other embodiments, multi-user device 228 can monitor both users 210, 214, and 216 and devices 218, 220, and 224. For example, in embodiments, multi-user device 228 can broadcast its identity to mobile devices 218, 220, 22, and 224 and initiate a data exchange with mobile devices 218, 220, 222, and 224. In other embodiments, mobile devices 218, 220, 222, and 224 can be equipped with technology that allow them to broadcast their presence and/or location. In some embodiments, multi-user device 228 can detect the presence of mobile devices 218, 220, 222, and 224 using any number of other suitable methods, as well.

According to various embodiments of the invention, multi-user device 228 provides conference-contact information associated with users 210, 214, and 216, for example, to multi-user-device server 230. As discussed above, multi-user device 230 stores the conference-contact information that it receives from multi-user device 228 in a status record 236 associated with multi-user device 228. The status record 236 can be maintained in a database 234 associated with multi-user-device server 230.

With continued reference to FIG. 2, user 212 may provide a conference-setup request to conference server 226, for example, by way of mobile device 220. To illustrate the functionality of aspects of embodiments of the present invention, suppose the conference-setup request provided by the user 212 is a request to initiate a conference communication (referred to herein, alternatively, as "a conference") between users 210, 212, 214, and 216. In embodiments of the invention, conference server 226 notifies multi-user device 230 of the conference-setup request and receives setup instructions from multi-user-device server 230.

Setup instructions can include information such as conference-contact information associated with users 210, 214, and 216. "Conference-contact information," as used herein, includes information related to a user's proximity to multi-user device 228 and the user's preferences for receiving conference invitations. For example, in embodiments, multi-user device 228 can detect that a user 214 or 216 is with multi-user device range 232. As explained in further detail below, multi-user device 228 may assign itself as a preferred device associated with the users 214 and 216 in response to determining that users 214 and 216 are located within multi-user device range 232. However, in some situations, a user 214 or 216 may not wish to participate in conference via multi-user device 228, but may wish rather to participate in any potential conferences using another device such as, for example, the user's respective mobile device 222 or 224. In order to override the multi-user device 228 preference, user 214 or 216 can provide user preferences to multi-user device 228.

As used herein, user preferences include information provided by user 214 or 216 related to conference-contact information associated with the user. For example, user 214 may provide user preferences in the form of input to multi-user device 228 indicating that user 214 prefers to be contacted via mobile device 222 in the event of an attempt to set up a conference. In response, multi-user device 228 can provide conference-contact information to multi-user-device server 230 associated with user 214. The conference-contact information includes an indication that a preferred device associated with user 214 is mobile device 222. Thus when conference server 226 notifies multi-user-device server 230 of a conference setup request initiated by user 212, multi-user device 230 can provide conference-contact information associated with user 214 to conference server 226.

Conference server 226 includes technology for receiving and interpreting setup instructions from multi-user-device server 230. After receiving setup instructions from multi-user-device server 230, conference server 226 can extract the conference-contact information associated with user 214 that indicates that conference server 226 should send any conference invitations meant for user 214 to mobile device 222. Similarly, for example, user 216 may provide user preferences to multi-user device 228 indicating a desire to keep multi-user device 228 as a preferred device associated with user 216. In other embodiments, user 216 can provide user preferences to multi-user device 228 that indicate user 216 is unavailable for any conferences. In various embodiments of the present invention, any number of other types of information can be provided to multi-user device 228 as user preferences to modify conference-contact information associated with users.

With reference to the preceding exemplary scenario, after receiving conference-contact information from multi-user-device server 230, conference server 226 initiates a conference by sending out conference invitations to the various invited users 210, 214, and 216. In the present example, conference server 226 may send a conference invitation to user 210 via mobile device 218. According to embodiments of the invention, mobile device 218 may be designated in conference-contact information as user 210's preferred device for conferencing. Multi-user device 228 can, in embodiments, have designated mobile device 218 as a preferred device in response to determining that user 210 is not within the multi-user device range 232.

According to various embodiments, multi-user device 228 can include information associated with other devices such as, for example, mobile device 218 that user 210 may interact with from time to time. In various embodiments, user 210 can establish priority rules, preferences, conditions, and the like to be used by multi-user device 228 when designated preferred devices associated with user 210. Continuing with the example described above, and with continued reference to FIG. 2, conference server 226 sends additional conference invitations to users 214 and 216. Based on the conference-contact information received from multi-user device 230, conference server 226 sends the invitation meant for user 214 to multi-user device 222. Similarly, conference server 226 sends the invitation meant for user 216 to multi-user device 228 based upon setup instructions containing conference-contact information associated with user 216 received from multi-user device 230.

Figure 3:
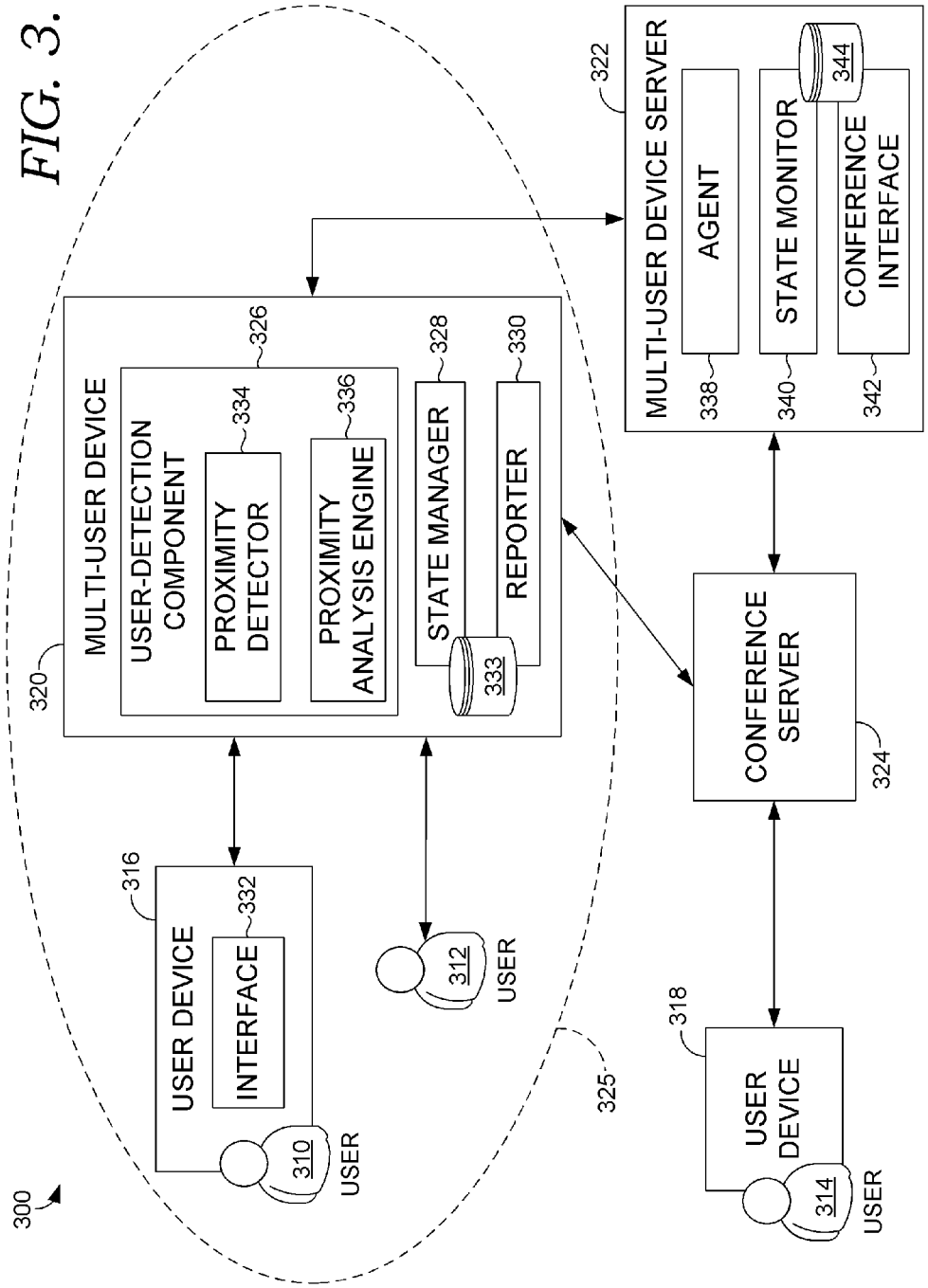
FIG. 3 depicts an illustrative operating environment of in accordance with embodiments of the invention.

Turning now to FIG. 3, an exemplary operating environment 300 is illustrated. Exemplary operating environment 300 includes users 310, 312, and 314, user device 316 and 318, multi-user device 320, conference server 324, multi-user-device server 322. As illustrated in FIG. 3, multi-user device 320 may have an associated multi-user device range 325 as described above with reference to FIG. 2. The exemplary operating environment 300 shown in FIG. 3 is an example of one suitable operating environment 300 and is not intended to suggest any limitation as to the scope of use or functionality of embodiments of the inventions disclosed throughout this document. Neither should the exemplary operating environment 300 be interpreted as having any dependency or requirement related to any single component or combination of components illustrated therein. For example, in embodiments, either or both of user devices 316 and 318 can be multi-user devices.

In various embodiments of the invention, multi-user-device range 325 includes specified distances from multi-user device 320 within which users 310 and 312 may be considered to be available for a conference using multi-user device 320. In embodiments, multi-user-device range 325 can include a functional range of hardware components of multi-user device 320, including, for example, microphones, speakers, display devices, cameras, and the like. In other embodiments, multi-user-device range 325 can be based on other factors such as the likelihood that a user 310 or 312 will find participating in a conference via multi-user device 320 to be convenient.

For example, a large conference room may include a multi-user device 320 at one end of the room. In this example, multi-user device 320 may have hardware components such as microphones, speakers, display devices, and cameras that are capable of receiving input and outputting information throughout the entire room. However, in some examples, one might understand that one or more users at one end of the conference room may not wish to participate in the conference via multi-user device 320, because of the trouble that they may have in crossing the room to use multi-user device 320, the lack of privacy, or any other factor that may affect the user's comfort with using multi-user device 320 in a conference communication.

As is further illustrated in FIG. 3, user device 316 can include an interface 332 for interacting with multi-user device 320. In embodiments, interface 332 can be used for broadcasting the presence of user device 316, detecting the presence and/or identity of multi-user device 320, facilitating communications (e.g., exchanges of data) between user device 316 and multi-user device 320, and the like. In embodiments, user 310 can submit user preferences to multi-user device 320 by way of interface 332. According to various aspects of embodiments of the invention, interface 332 can be used for any number of purposes involving communicating with multi-user device 320.

As illustrated in FIG. 3, multi-user device 320 includes user-detection component 326, state manager 328, and reporter 330. According to various embodiments of the invention, user-detection component 326 gathers proximity data associated with a user 310 or 312 that indicates whether the user 310 or 312 is within multi-user device range 325. User-detection component 326 processes this proximity data to generate user-proximity information that indicates the proximity of user 310 or 312 to multi-user device 320, for example, with respect to multi-user device range 325. User-detection component 326 provides user-proximity information to state manager 328 which can store user-proximity information in associated database 333.

In various embodiments, state manager can also receive user preferences from users 310 and 312, which can be stored in database 333. In embodiments, state manager 328 includes functionalities for managing data stored in 333, including, but not limited to, providing updates to the data stored in database 333, extracting data in response to user or machine request, and the like. For example, in an embodiment, state manager 328 can designate preferred devices associated with users 310 and 312. In some embodiments, state manager 328 receives user-proximity information from user-detection component 326 and references the user-proximity information to determine whether the information reflects a probability that the user is within multi-user-device range 325. In some embodiments, for example, if the probability that a user such as user 310 is within multi-user-device range 325 exceeds a threshold, state manager 328 designates multi-user device 320 as the user's 310 default preferred device. In embodiments, if the probability does not exceed the threshold, state manager 328 does not designate multi-user device 320 as the user's 310 default preferred-device, in which case state manager 328 might designate some other device as the user's 310 default preferred-device. In some cases, user 310 can communicate with multi-user device 320 to indicate a desire to replace the default preferred-device designation with a different device, which user 310 can identify. User 310 may also, in embodiments, be able to configure state manager 328 to always use a particular device (which may not, necessarily, be multi-user device 320) as the user's 310 default preferred-device.

In embodiments, reporter 330 interacts with an agent 338 located on multi-user-device server 322. Agent 338 and reporter 330 can be figured to communicate with each other according to any number of protocols and communication technologies. As further illustrated in FIG. 3, multi-user-device server 322 also includes state monitor 340 and conference interface 342. In embodiments, state monitor 340 receives conference-contact information associated with users 310 and 312 via agent 338 and stores this conference-contact information in a local database 344. According to some embodiments of the invention, multi-user-device server 322 may maintain status records associated with a number of multi-user devices 320. These records can be stored, for example, in database 344 and may include conference-contact information for one or more users associated with the corresponding multi-user device.

With continued reference to FIG. 3, user-detection component 326 includes proximity detector 334 and proximity analysis engine 336. In embodiments, proximity detector 334 can include any number of devices, sensors, programs, applications, algorithms, and the like for gathering data associated with the proximity of a user 310 or 312 to multi-user device 320. In embodiments, proximity detector 334 can include, for example, detectors that can be used to ascertain whether a user device 316 is within multi-user device range 325. For example, in some embodiments, proximity detector can include a module that communicates with user device 316 via interface 332 on user device 316. In this manner, multi-user device 320 can maintain information about the density of user devices 316 within multi-user device range 325.

Additionally, in embodiments, proximity detector 334 can include biological detectors that can detect heat, certain chemicals given off by the human body, sounds, and any other types of data that can be used to determine the possible proximity of a user 310 or 312 to multi-user device 320. Proximity detector 334 provides proximity data that it collects to proximity-analysis engine 336 which analyzes proximity data to determine user proximity to generate user-proximity information, which it provides to state manager 328.

User proximity information can be used, for example, by state manager 328 to initially designated multi-user device 320 as a preferred device associated with a user 310 or 312 that is determined to be within multi-user device range 325. According to various embodiments, as explained above, state manager 328 can also receive user preferences from users 310 and 312 that may confirm the designation of multi-user device 320 as a preferred device for user 310 or 312. In other embodiments, state manager may receive user preferences from user 310 or 312 that include an indication that user 310 or 312 wishes to override the default designation of multi-user device 320 as that user's preferred device. In some embodiments, the user preferences can include an identification of another device such as, for example, user device 316 to be designated as user 310's preferred device.

In embodiments of the invention, user 314 may submit a conference-setup request via user device 318 to conference server 324. In response, conference server 324 provides a conference notification to multi-user-device server 322. Multi-user device 322 can provide conference-contact information regarding users 310 and 312 to conference server which conference server utilizes in initiating the conference between users 310, 312, and 314.

Figure 4:
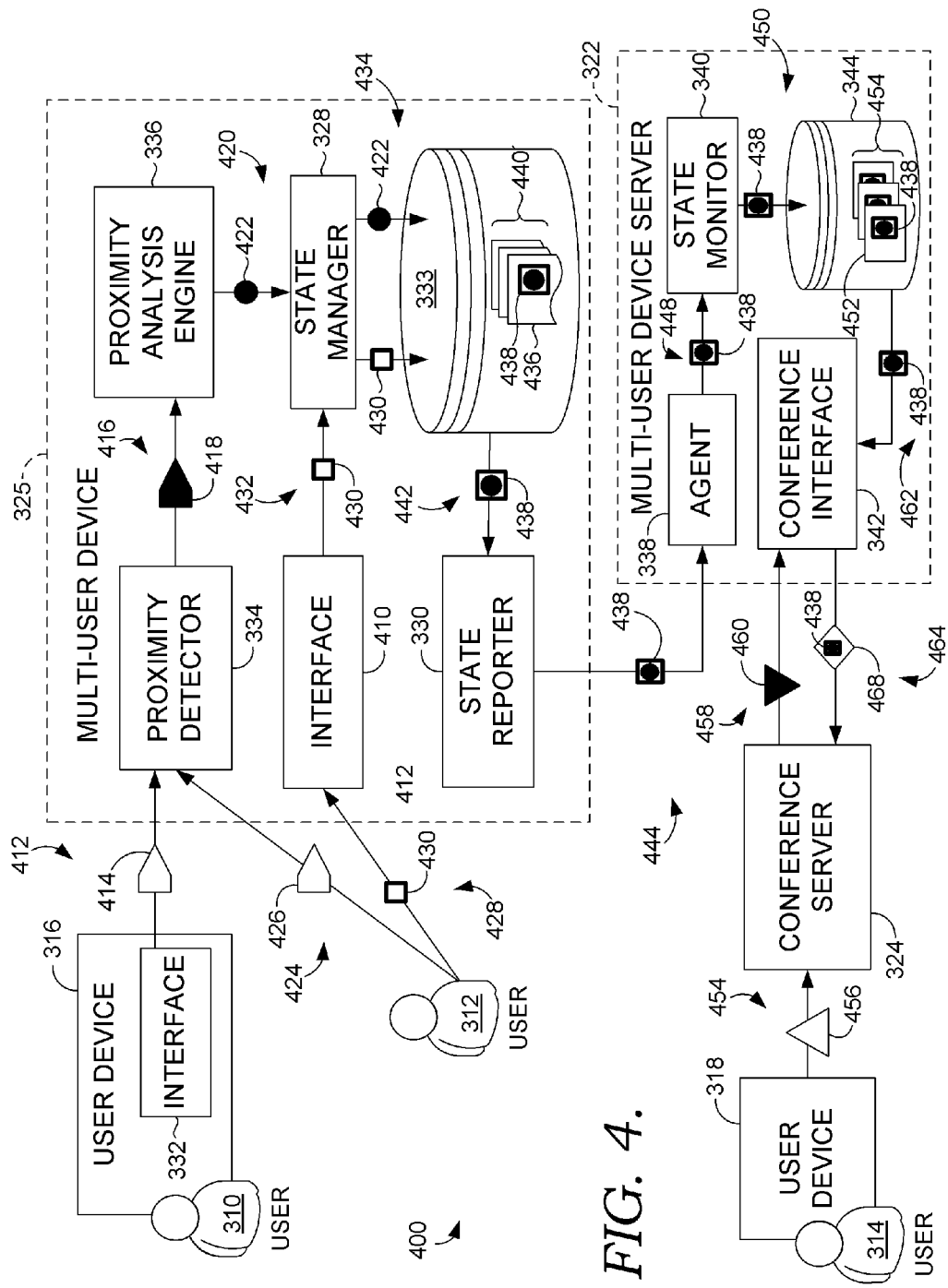
FIG. 4 depicts an illustrative implementation of an embodiment of the invention.

Turning now to FIG. 4, an illustrative implementation 400 of the present invention is depicted. Illustrative implementation 400 includes components discussed above and illustrated in FIG. 3. That is, as illustrated in FIG. 4, illustrative implementation 400 includes users 310, 312, and 314, user devices 316 and 318, multi-user device 320, multi-user-device server 322, and conference server 324. The illustrative implementation 400 shown in FIG. 4 is an example of one suitable implementation 400 and is not intended to suggest any limitation as to the scope of use or functionality of embodiments of the inventions disclosed throughout this document. Neither should the illustrative implementation 400 be interpreted as having any dependency or requirement related to any single component or combination of components illustrated therein.

As illustrated in FIG. 4, and more particularly as referenced by numeral 412, multi-user device 320 may receive proximity input 414 associated with user 310 and/or user device 316. Proximity detector 334 collects proximity data 418 in the form of proximity input 414. As discussed above, proximity detector 334 can collect any number of different types of data including biological indications of the presence of user 310 or 312, telecommunications signals from user device 316 indicating the proximity of user device 316 and the like. Additionally, in embodiments, proximity detector 334 can receive user credentials from a user 310 or 312 and through an authentication process generate proximity data 418 that can be analyzed to indicate the proximity of a user 310 or 312.

In FIG. 4, as referenced at 416, proximity detector 334 provides proximity data 418 to proximity-analysis engine 336. Proximity-analysis engine 336 processes proximity data 418 to generate user-proximity information 422. Proximity-analysis engine 336 provides user-proximity information 422 to state manager 328. Additionally, according to embodiments of the invention, and as referenced at 424, proximity detector 334 can receive proximity input 426 associated with user 312. User 312 may also submit user preferences 430 as referenced at 428 via an interface 412 within multi-user device 325 to state manager 328 which provides user preferences 430 to state manager 328.

In embodiments, state manager 328 stores user-proximity information 422 and user preferences 430 in a database 333. In embodiments, state manager 328 stores this information as conference-contact information associated with the users 310 and 312. Conference-contact information 438 can include user-proximity information 422 and user preferences 430, both of which are associated with a user 310 or 312. Conference-contact information can be stored as user data 436 in database 333.

According to various embodiments of the invention, as shown at 442, state reporter 330 can receive the conference-contact information 438 associated with a user 310 or 312 and provide conference-contact information 438 to multi-user-device server 322 via agent 338 as shown at 444. As shown at 448, agent 338 provides conference-contact information to state monitor 340. In embodiments, state monitor 340 stores conference-contact information 438 in database 344 as shown at reference 450.

In embodiments, state monitor 340 can store conference-contact information 438 as part of a status record 452 associated with multi-user device 320. In various embodiments, multi-user-device server 322 can interact with a number of multi-user devices 320. Accordingly, database 344 can include a number of status records 452 associated with the multi-user device 320.

As illustrated in FIG. 4 at reference numeral 454, user 314 provides a conference-setup request 456 to conference server 324. In embodiments, as shown as 458, conference server 324 provides a conference notification 460 to multi-user-device server 322 via conference interface 342. In embodiments, conference interface 342 can be any type of conferencing client, agent, application, API, program, module, or the like that facilitates communication between multi-user-device server 322 and conference server 324.

As is further illustrated at reference numeral 462, conference interface can retrieve conference-contact information 438 associated with a user 310 and 312 and as shown at reference 464, and can provide a setup instruction 468 to conference server 324 to be used by conference server 324 in setting up the requested conference. In embodiments, setup instruction 468 includes conference-contact information 438 associated with the user 310 or 312. Although not shown in FIG. 4 so as to preserve the clarity of the illustration, conference server 324 uses the information 438 in setup instruction 468 to provide conference invitations to users 310 and 312 according to conference-contact information 438 provided by multi-user-device server 322.

Figure 5:
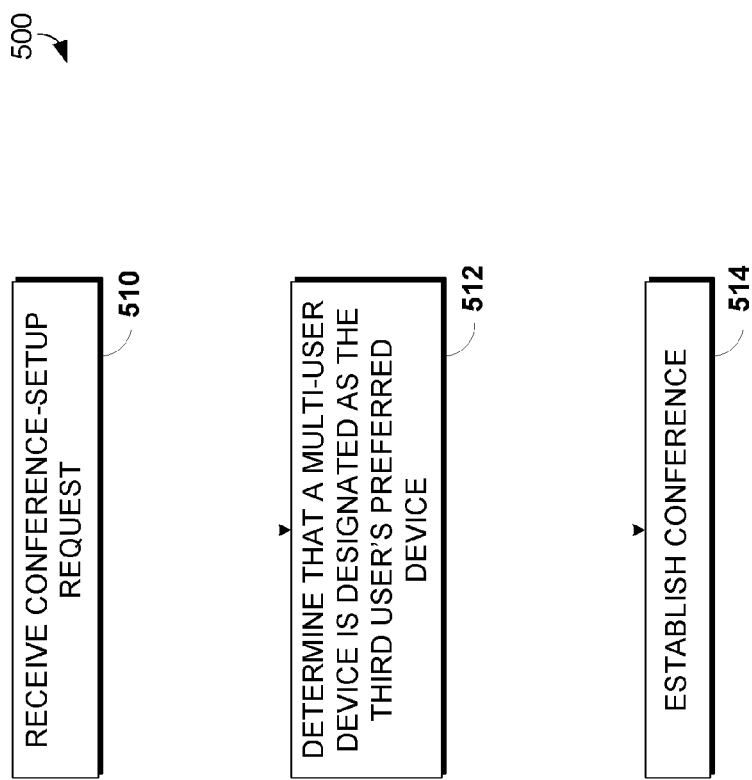
FIG. 5 is a flow diagram depicting an illustrative method of consolidating multi-party communications in accordance with embodiments of the inventions.

To recapitulate, embodiments of the inventions have been disclosed in the context of computer-readable media, a communications device, a network environment, and methods for consolidating multi-party communications using multi-user devices. Turning to FIG. 5, a flow diagram is provided, showing an illustrative method 500 of consolidating a multi-party communication. At a first illustrative step, step 510, a conference server receives a request from a first user's device to set up a conference between a first user, a second user, and a third user.

At step 512, the conference server determines that a multi-user device is designated as the third user's preferred device. In embodiments, the conference server determines that the multi-user device designated as the third user's preferred device by receiving an indication of the preferred device from a multi-user-device server. In some embodiments of the invention, the designation of the multi-user device as the third user's preferred device is based at least in part on a determination that the third user is within a specified distance of the multi-user device. In some embodiments, the multi-user device includes technologies for determining the proximity of the third user and can store user proximity information indicating whether the third user is within the specified distance of the multi-user device. According to various embodiments of the invention, a user may also provide user preferences to the multi-user device and/or to the multi-user-device server which can modify the designation of a preferred device associated with the third user.

At a final illustrative step 514, the conference server establishes a conference between the first user, the second user, and the third user in which the third user participates via the multi-user device. According to various embodiments of the invention, the conference server receives conference-contact information associated with the third user from the multi-user-device server. The conference server can use this conference-contact information associated with the third user to determine the preferred device associated with the third user. In response, the conference server sends the conference invitation meant for the third user to the third user via the user's preferred device.

Figure 6:
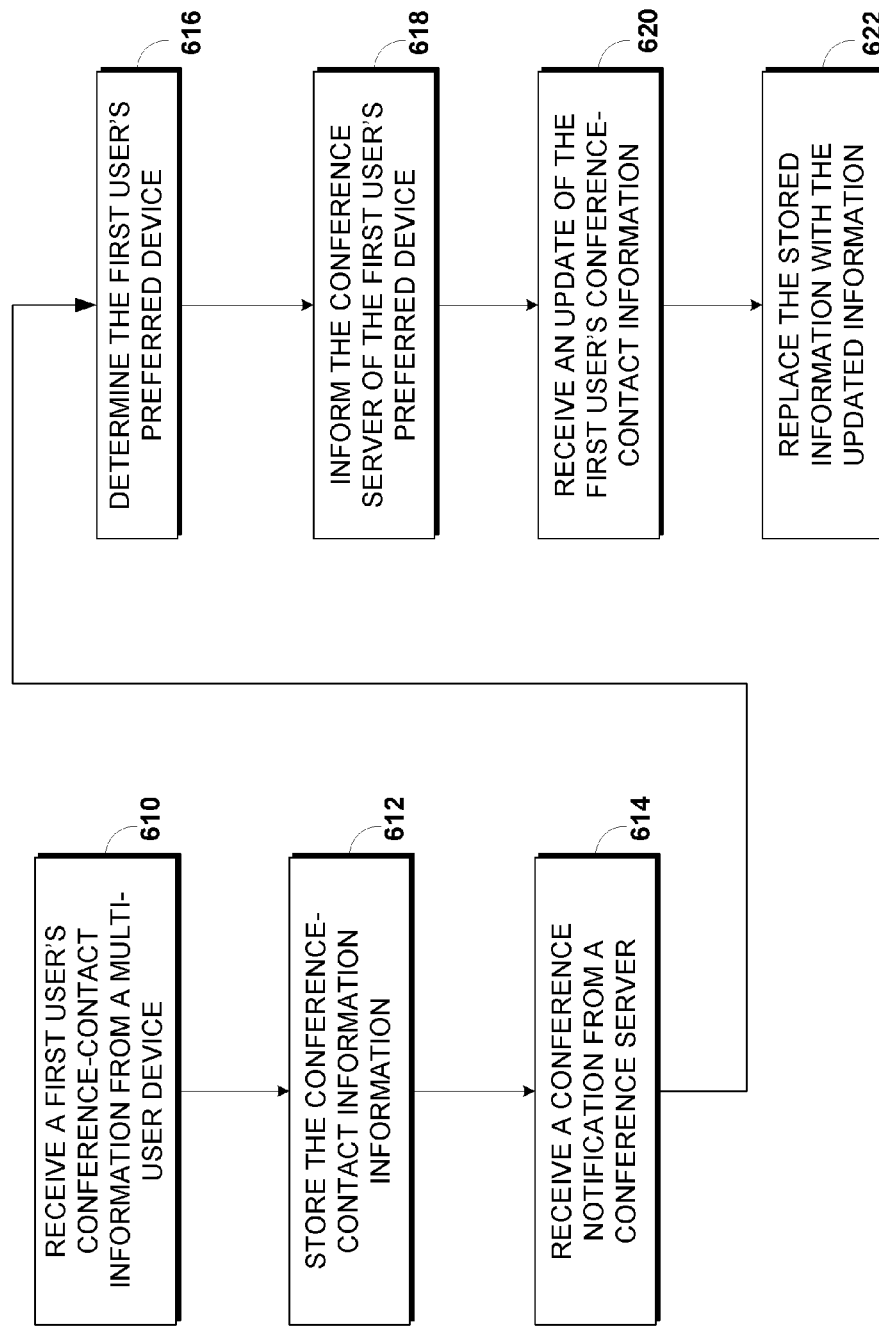
FIG. 6 is another flow diagram depicting an illustrative method of consolidating multi-party communications in accordance with embodiments of the invention.

Turning now to FIG. 6, another flow chart is illustrated which depicts an exemplary method 600 of consolidating a multiparty communication. At a first illustrative step, step 610, a multi-user-device server receives conference-contact information from a multi-user device. In embodiments, the conference-contact information includes an indication of whether the first user is within a predetermined physical proximity of the multi-user device. In some embodiments, the conference-contact information may also include an indication of a preferred device associated with the first user.

At step 612, the conference-contact information is stored. According to various embodiments of the invention, the conference-contact information can be stored in a status record corresponding to the multi-user device. In some embodiments, the multi-user-device server may store any number of status records corresponding to any number of additional multi-user devices that interact with the multi-user-device server. At step 614, the conference notification is received from a conference server. In embodiments, the conference notification can include any number of different types of information such as, for example, a request from a second user to set up a conference between the first user, the second user, and the third user. As illustrated at step 616, the multi-user-device server determines, based at least in part upon the conference-contact information associated with the first user, a preferred device associated with the first user.

As described above, in embodiments of the invention, the preferred device of the first user is the device on which the user is to be contacted for a conference. In embodiments, the preferred device can be a mobile device, a computer, or any other type of communication device that the user may wish to use in participating in conference communications. At a step 618, the conference server is informed of the first user's preferred device. At a step 620, an update of the first user's conference-contact information is received, for example, from multi-user device, and at a final illustrative step 622, the multi-user-device server replaces the stored conference-contact information associated with the user with the updated information.

Figure 7:
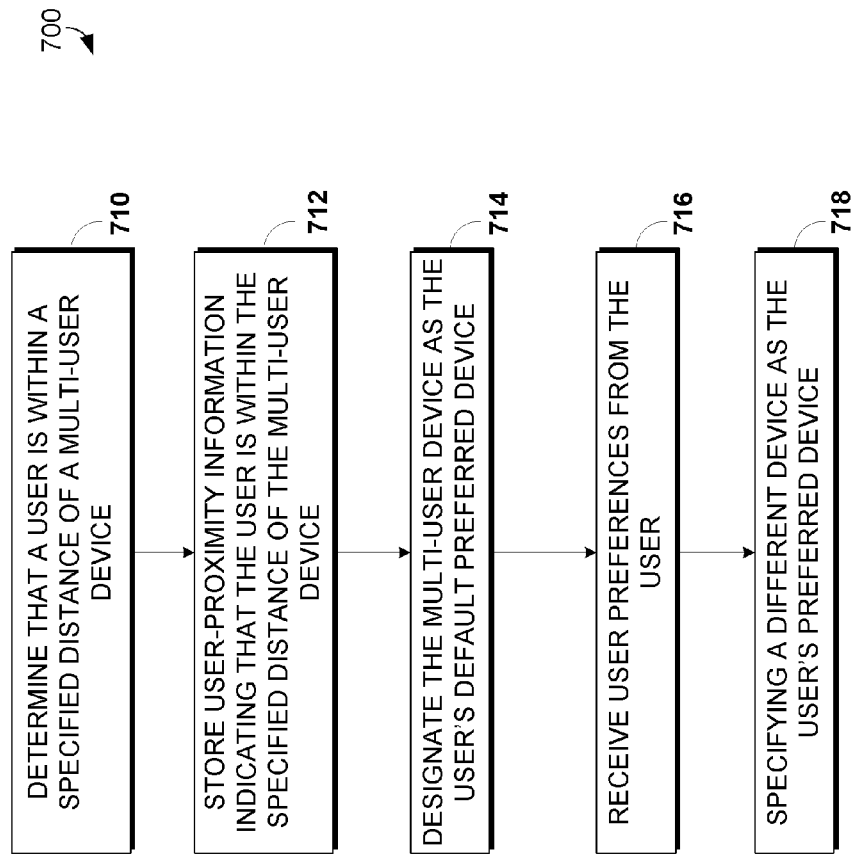
FIG. 7 is another flow diagram depicting an illustrative method of consolidating multi-party communications in accordance with embodiments of the inventions.

Turning now to FIG. 7, another flow chart is illustrated which depicts an exemplary method 700 of generating conference-contact information associated with a user. At a first illustrative step, step 710, a determination is made that a user is within a specified distance of the multi-user device. At step 712, user-proximity information indicating that the user is within the specified distance of the multi-user device is stored, and at 714, the multi-user device is designated as the user's default preferred device.

According to various embodiments of the invention, and as shown at 716, user preferences are received from the user. In embodiments, user preferences can include, for example, indications of devices that the user wishes to be designated as preferred devices, any number of rules, conditions, or algorithms for determining the preferred device, and the like. At a final illustrative step, step 718, a different device is specified as the user's preferred device. In embodiments, this specification can be based, for example, upon information in the user preferences received from the user. That is, for example, the user preferences may include an instruction to designate a mobile device as the user's preferred device rather than the default designation of the multi-user device.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. A Non-transitory computer-readable media having computer-executable instructions embodied thereon that, when executed, facilitate a method of consolidating a multi-party communication, the method comprising:
   receiving conference-contact information from a multi-user device associated with a first user, the first user also associated with a separate single user communication device, said conference-contact information including an indication of whether a first user is within a predetermined physical proximity of the multi-user device;
   storing said conference-contact information in a status record corresponding to the multi-user device;
   receiving a conference notification from a conference server, said notification comprising a request from a second user to set up a conference between the first user, the second user, and a third user;
   determining, based at least in part upon said conference-contact information, that the multi-user device is a default preferred device associated with the first user by evaluating priority rules that specify which of two or more of the user's devices is preferred in different conditions, and wherein the multi-user device is the default preferred device according to the priority rules when the first user is within a predetermined physical proximity of the multi-user device, wherein the default preferred device is a device on which the first user should be contacted;
   receiving an indication from the multi-user device that the first user will not communicate on the multi-user device during the conference;
   upon receiving the indication, receiving one or more user preferences from the first user indicating that the separate single user communication device is a preferred device for use during the conference; and
   providing the conference server with a setup instruction comprising a setup contact identifier that identifies the separate single user communication device as the preferred device for use during the conference.

2. The non-transitory computer-readable media of claim 1, wherein said conference-contact information further includes an indication of a preferred default device associated with the first user.

3. The non-transitory computer-readable media of claim 2, further comprising:

receiving updated conference-contact information from the multi-user device; and replacing the stored conference-contact information with said updated conference-contact information.

4. The non-transitory computer-readable media of claim 1, wherein the conference server establishes a conference between the first user, the second user, and the third user.

5. The non-transitory computer-readable media of claim 4, wherein the third user participates in the conference by way of said default preferred device.

6. The non-transitory computer-readable media of claim 5, wherein the conference includes a video-conference.

7. A multi-user communications computing device that facilitates consolidation of multi-party communications, the multi-user communications computing device comprising:
a processor; and at least one memory storing instructions that, when executed by the processor, instruct the processor to execute:
a user-proximity detection component that determines whether a first user is within a specified distance of said multi-user device and that generates user-proximity information associated with the first user, wherein said user-proximity information includes an indication of whether the first user is within a predetermined distance of said multi-user device, and wherein the first user is associated with at least one communication device in addition to the multi-user device;
a preference manager that receives said user-proximity information from the user-proximity detection component and determines a default device associated with the first user by evaluating priority rules that specify which of two or more of the user's devices is preferred in different conditions, and wherein the multi-user device is determined to be the default device according to the priority rules, wherein the first user is allowed to update the default device to a preferred device, wherein the preferred device is a device on which the first user is to be contacted for a conference;
a reporter that provides a multi-user-device server with conference-contact information associated with the first user, wherein the conference-contact information identifies the preferred device associated with the first user; and
a conference interface component configured to receive a conference notification from a conference server, said notification comprising a request from a second user to set up a conference between the first user, the second user, and a third user, wherein, when the first user has updated the default device to a preferred device, the conference server is notified of the preferred device for the first user prior to connecting a conference communication between the first user, the second user and the third user.

8. The multi-user communications computing device of claim 7, wherein the proximity detector detects whether a mobile device associated with the first user is within a predetermined distance of said multi-user device.

9. The multi-user communications computing device of claim 7, wherein the proximity detector records sound and provides the recorded sound to the proximity-analysis engine, wherein the proximity-analysis engine determines whether a voice associated with the first user is included within the recorded sound.

10. The multi-user communications computing communications computing device of claim 7, wherein the proximity detector receives authentication credentials from the first user.

* * * * *